United States Patent [19]

Broadley

[11] Patent Number: 4,943,409

[45] Date of Patent: Jul. 24, 1990

[54] REACTIVITY CONTROL IN NUCLEAR REACTORS

[75] Inventor: Donald Broadley, Warrington, United Kingdom

[73] Assignee: National Nuclear Corporation Limited, Knutsford, United Kingdom

[21] Appl. No.: 162,120

[22] Filed: Feb. 29, 1988

[30] Foreign Application Priority Data

Mar. 31, 1987 [GB] United Kingdom ................ 8707614

[51] Int. Cl.$^5$ ............................ G21C 7/00; G21C 9/00
[52] U.S. Cl. ...................................... 376/212; 376/244; 376/303; 376/352; 376/445; 376/448
[58] Field of Search ........ 376/212, 213, 244, 302–304, 376/399, 352, 445, 448

[56] References Cited

U.S. PATENT DOCUMENTS

| 3,549,491 | 12/1970 | Johnson | 376/303 |
|---|---|---|---|
| 3,661,708 | 5/1972 | Friedland . | |
| 3,846,234 | 11/1974 | Class et al. . | |
| 3,900,367 | 8/1975 | Class | 376/303 |
| 3,939,039 | 2/1976 | Seki et al. | 376/303 |
| 3,964,969 | 6/1976 | Brynsvold et al. | 376/303 |
| 4,038,133 | 7/1977 | Bittermann et al. | 376/363 |
| 4,104,120 | 8/1978 | Grubelich | 376/364 |
| 4,227,967 | 10/1980 | Zebroski | 376/219 |
| 4,295,935 | 10/1981 | Anthony | 376/285 |
| 4,325,786 | 4/1982 | Wohlsen | 376/303 |

FOREIGN PATENT DOCUMENTS

| 1151356 | 5/1969 | United Kingdom | 376/302 |
|---|---|---|---|
| 1226264 | 3/1971 | United Kingdom | 376/303 |

*Primary Examiner*—Harvey E. Behrend
*Attorney, Agent, or Firm*—William R. Hinds

[57] ABSTRACT

To provide intrinsic reactor safety, the fuel sub-assemblies of a nuclear reactor core are provided with reactivity control mechanisms operable, in response to temperature rises above desired limits, to interact with adjacent fuel sub-assemblies and effect radial dilation of the core in order to reduce reactivity. Various embodiments are disclosed in which differential thermal expansion of an operating device or devices (34; 40; 42, 44, 46; 50) is translated into radially outward displacement of a lever or levers (28) for contact with neighbouring sub-assemblies.

16 Claims, 5 Drawing Sheets

REACTIVITY CONTROL IN NUCLEAR REACTORS

FIELD OF THE INVENTION

This invention relates to the control of reactivity in nuclear reactors.

BACKGROUND OF THE INVENTION

It is known, from for example British Pat. No. 1,176,646 and U.S. Pat. No. 4131510, that radial dilation of the core of a nuclear reactor results in a decrease in core reactivity U.S. Pat. No. 4,131,510 discloses an electromagnetically-operated core restraint structure which normally restrains radial dilation of the core but, in response to a temperature rise above the Curie point of the ferromagnetic materials employed, is disabled to permit radial dilation and thereby reduce reactivity.

British Patent No. 1,176,646 is concerned with a different approach in which the fuel sub-assemblies forming the core are mounted at their lower ends via ball joints seating in bearing cups fabricated from materials having differing coefficients of thermal expansion. In response to temperature increase at the coolant inlets of the sub-assemblies (which inlets are located below the core itself), the differing expansions lead to deflections of the sub-assemblies about the ball joints in directions corresponding to core dilation.

U.S. Pat. No. 3,600,276 discloses a reactivity control arrangement for a nuclear reactor core in which the fuel sub-assemblies contact one another through the agency of inclined contact faces acting in the manner of wedges, the fuel sub-assemblies being arranged in groups with differing mounting arrangements so that one group undergoes displacement relative to the other when the sub-assemblies undergo thermal expansion.

British Patent Applications Nos. 2,048,552A and 2,064,202A disclose grid designs for pressurised water reactor core fuel elements in which bimetallic components are incorporated in certain ones of the fuel element grids in order to control bowing of the fuel elements during reactor operation.

An object of the present invention is to provide improved reactivity control means for a nuclear reactor core.

FEATURES AND ASPECTS OF THE INVENTION

According to one aspect of the present invention there is provided a fuel sub-assembly for a nuclear reactor, said sub-assembly comprising an elongated tubular housing having, at or adjacent opposite ends thereof, coolant inlet means and coolant outlet means respectively, a coolant transversable fuel-bearing region enclosed within the housing between the inlet means and the outlet means, means comprising at least one elongate element located within, and extending generally longitudinally of, the housing for undergoing differential longitudinal thermal expansion relative to said housing as the temperature of the coolant increases, and radially extensible means coupled to said elongate element and to said housing and responsive to differential longitudinal thermal expansion of said element relative to said housing for projecting beyond the outer periphery of the housing so as to effect, in use, relative displacement between the sub-assembly and a neighbouring sub-assembly or sub-assemblies.

According to a second aspect of the invention there is provided a nuclear reactor comprising a plurality of elongated, generally vertically-oriented fuel sub-assemblies mounted in side-by-side relation and supported at their lower ends by a core support structure, each sub-assembly comprising an elongated tubular housing having coolant inlet means at or adjacent its lower end and coolant outlet means at or adjacent its upper end and enclosing, at a level intermediate the inlet and outlet means, a fuel-bearing region which the coolant transverses in flowing through the housing from the inlet means to the outlet means, at least some of the fuel sub-assemblies each being provided with at least one elongate element located within, and extending generally longitudinally of, the housing for undergoing differential longitudinal thermal expansion relative to said housing as the coolant temperature increases, and radially extensible means coupled to said elongate element and to said housing for translating longitudinal differential thermal expansion of said elongate element relative to said housing into displacement of the associated sub-assembly relative to at least one neighbouring sub-assembly.

Further features and aspects of the invention will become apparent from the following description of various embodiments shown, by way of example only, in the accompanying drawings.

DESCRIPTION OF PREFERRED EMBODIMENTS

Figure 1:
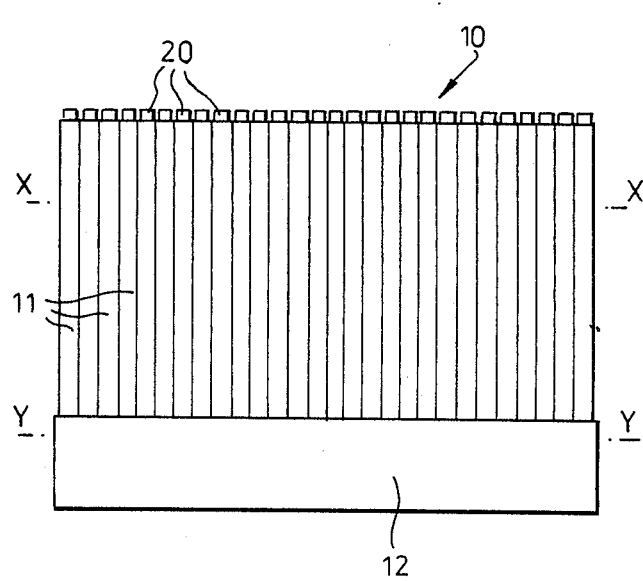
FIG. 1 is a diagrammatic view of the core assembly and diagrid of a liquid metal cooled fast breeder reactor (LMFBR)
Figure 2:
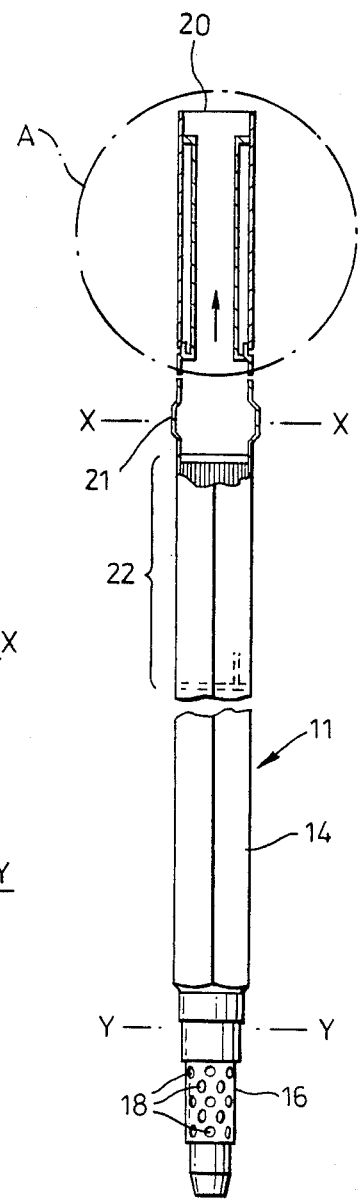
FIG. 2 is a diagrammatic view, partly-cutaway, of a fuel sub-assembly embodying the present invention.

Referring to FIG. 1, the core assembly of a LMFBR comprises an array 10 of fuel sub-assemblies 11, each generally of the form shown in FIG. 2, mounted on a diagrid 12 through which the coolant, normally liquid sodium, from the so-called cold pool is supplied. As shown in FIG. 2, each sub-assembly comprises a tubular housing or wrapper 14 which, over the major part of its length, is of hexagonal section and is fabricated from a ferritic steel. The wrapper 14 at its lower end terminates in a spike member 16 by means of which the sub-assembly plugs into the diagrid structure 12. The spike member 16 includes inlet apertures 18 through which coolant enters the wrapper before flowing upwardly (see arrows) through the latter and discharging into the hot sodium pool via the outlet end 20 of the sub-assembly. In passing upwardly from the inlet 18 to the outlet 20, the coolant traverses the fuel-bearing region 22, the fuel being in the form of pellets encapsulated in elongated sealed cans which are located in generally parallel spaced relation by wires or grids to allow coolant flow through the gaps The fuel may be fissile and/or fertile.

The sub-assemblies 11 are in effect mounted, via their spike members 16, in cantilevered fashion from the diagrid with the lower support plane for the core array located at the level Y—Y. The sub-assemblies 11 are arranged to make contact with each other at the higher plane X—X. Such contact may be though support or abutment pads 21 projecting from the faces of the wrapper in this region. Above the fuel-bearing region of the sub-assembly in the vicinity of the wrapper outlet 20, a reactivity control mechanism is provided, preferably within each sub-assembly of the array, which serves to control reactivity by effecting radial dilation of the reactor in response to coolant temperature increase as a result of power increase or reduction in the coolant flow rate. Various embodiments of the mechanism are shown in FIGS. 3-14; in each instance, the mechanism is based on differential thermal expansion as will become apparent from the following description.

Figure 3:
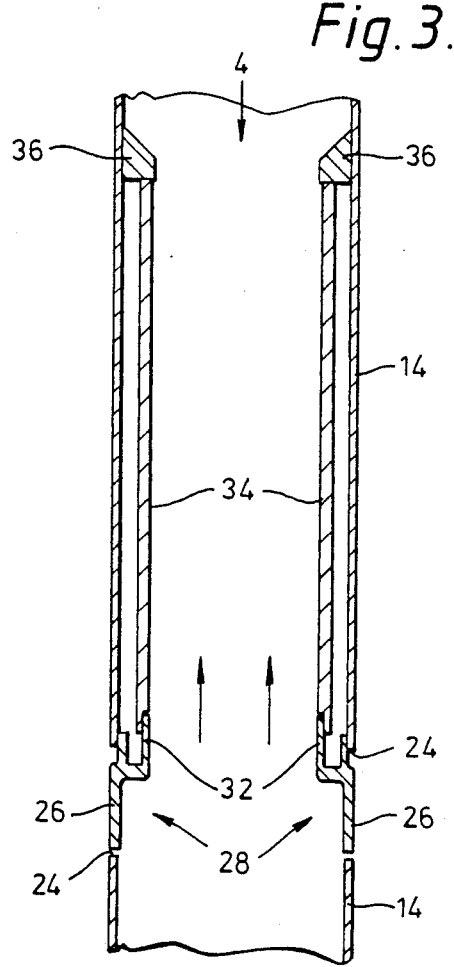
FIG. 3 is an enlarged view of the part circled A in FIG. 2.
Figure 5:
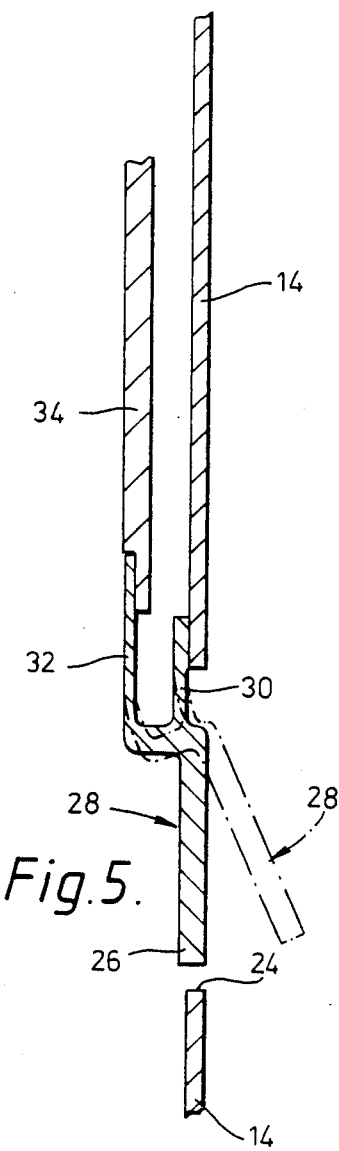
FIG. 5 is a further enlarged view of part of FIG. 3.
Figure 4:
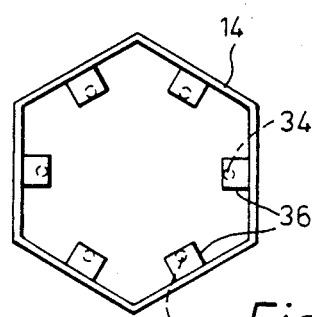
FIG. 4 is a plan view in the direction 4 in FIG. 3.

Referring to FIGS. 3-5, each face of the wrapper 14 is formed with an aperture 24 which, normally, is substantially closed by one arm 26 of a respective cranked lever 28 which is connected to the wrapper by a mounting arm 30 having sufficient resilience to flex and allow the lever 28 to undergo pivotal movement as indicated in broken outline in FIG. 5. A second lever arm 32 of the cranked lever 28 is coupled to the free end of a respective rod 34 which extends longitudinally of the wrapper 14 and is axially restrained at its opposite end by a fixed abutment 36.

The rods 34 are composed of a material which has a larger coefficient of linear thermal expansion than the wrapper material. By way of example, the rods 34 may be of austenitic steel while the wrapper may be of ferritic steel, the latter material having a linear thermal expansion coefficient of the order of 50% less than that of austenitic steel. When the desired operating conditions of the reactor prevail, the sub-assembly outlet temperatures will lie within a certain range and the levers 26 will have their arms generally flush with the wrapper faces as shown in FIGS. 3 and 5.

If a fault condition, such as coolant flow reduction, develops which leads to a coolant temperature rise in any one or more sub-assemblies, it will be seen that differential expansion of the rods 34 relative to the wrapper will lead to pivotal deflection of the levers in a radially outward direction. An initial part of this deflection will be lost motion, ie until the space between neighbouring sub-assemblies (as determined by the contacting abutment pads) is taken up. Once taken up, further deflection of the levers 28 will lead to increase in the spacing between the sub-assemblies by causing the sub-assemblies to deflect, about their cantilever mountings with the diagrid with consequent dilation of the core towards a wheatsheaf-like configuration. The design may be such that the sub-assembly reactivity control mechanisms are effective to create sufficient dilation of the core to shut the core down in the event that the coolant temperature rises to a preselected value, eg of the order of 100° C. above the sub-assembly outlet temperatures when the reactor is operating under normal conditions. Alternatively, the control mechanism design may be such that a thermostat effect is achieved, ie core dilation occurs so as to maintain the sub-assembly outlet temperature constant. Thus, the invention has the potential for providing a reactor core which is intrinsically safe against factors such as rod withdrawal faults, loss of pumping power due to for example loss of station electrical supplies, and failure of heat transport systems due to failure of secondary circuits.

Figure 6:
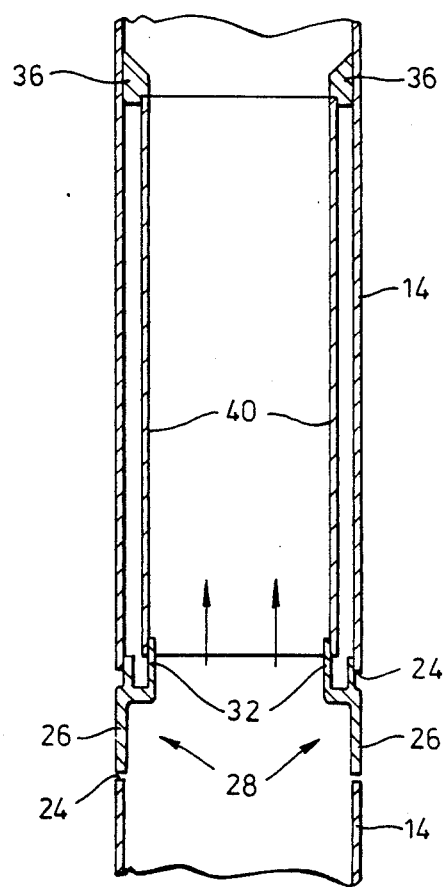
FIGS. 6–8, FIGS. 9–11 are views corresponding to those of FIGS. 3–5 but showing alternative implementations of the invention.
Figure 8:
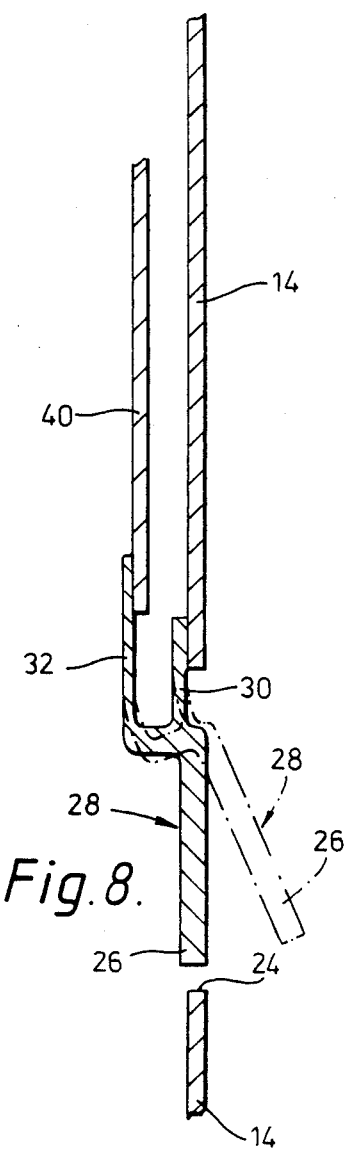
Figure 7:
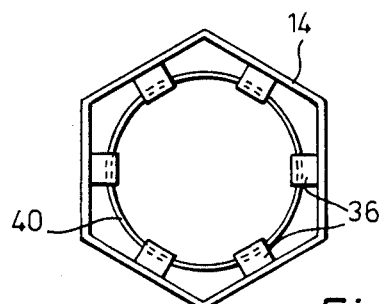

The embodiment of FIGS. 6-8 is generally similar to that of FIGS. 3-5 and, where appropriate, the same reference numerals are used to identify components common to both embodiments; the same applies to the embodiments of FIGS. 9-11 and FIGS. 12-14. In FIGS. 6-8, the levers 28 are operated by the free end of a cylinder 40 of for example austenitic steel connected to a wrapper 14 of for example ferritic steel.

Figure 9:
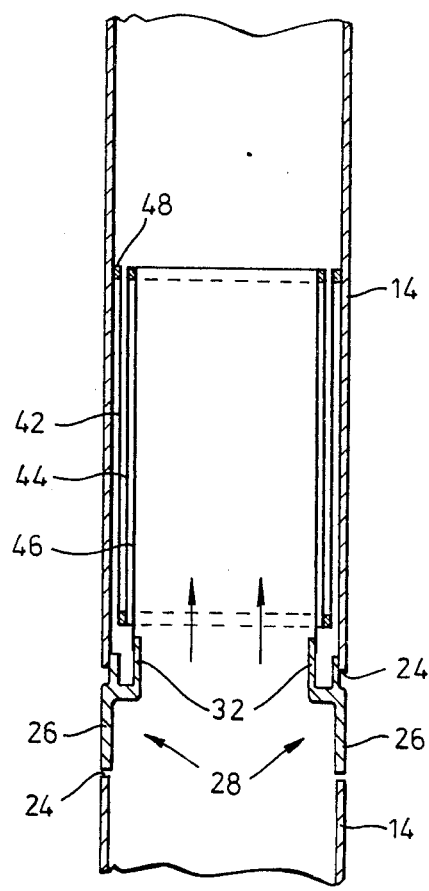
Figure 11:
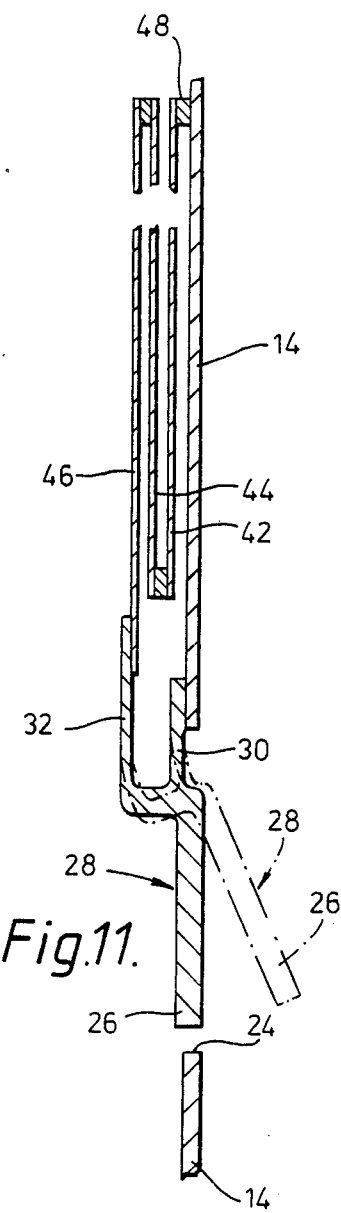
Figure 10:
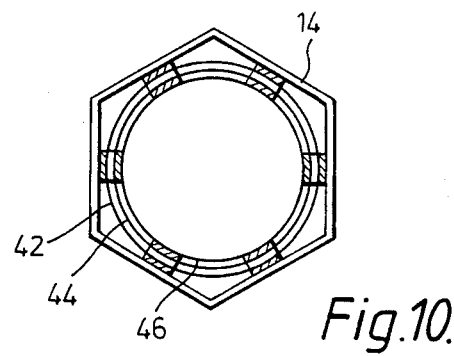

The embodiment of FIGS. 9-11 also employs an annular form of lever-operating mechanism. In this instance, the operating mechanism effectively acts as a displacement amplifier in that a nest of serially connected cylinders 42, 44, 46 act between the wrapper 14 and the levers 28. The upper end of the outer cylinder 42 is connected at 48 to the wrapper and at its lower end to the lower end of the intermediate cylinder 44 which, in turn, is connected at its upper end to the upper end of the inner cylinder 46 whose lower end is linked to the arms 32 of the levers 28. The cylinders 42 and 46 are composed of a material, eg ferritic steel, having a larger linear thermal expansion coefficient than the intermediate cylinder 44 which may be of austenitic steel. With this arrangement, it will be seen that the displacement obtainable for a given cylinder size is enhanced in comparison with that achievable in the case of a single cylinder as in the case of FIGS. 6-8.

Figure 12:
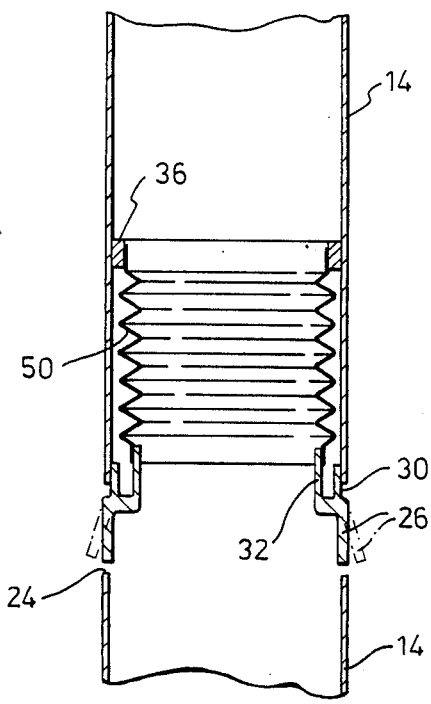
FIGS. 12 and 13 likewise correspond to FIGS. 3 and 4 and show a further embodiment of the invention.
Figure 14:
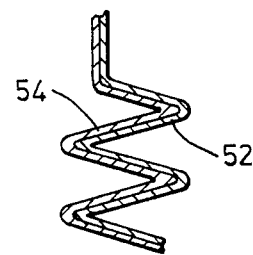
FIG. 14 is an enlarged view of the part within the circle marked B in FIG. 12.
Figure 13:
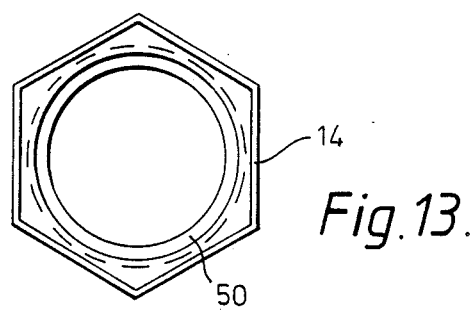

In the embodiment of FIGS. 12-14, the lever-operating mechanism comprises an axially expansible and contractible bellows 50 acting between the wrapper 14 and the arms 32 of the levers 28. The bellows 50 is fabricated from a bimetallic laminate, ie two layers 52, 54 having differing coefficients of thermal expansion.

It will be noted that in each of the illustrated embodiments the reactivity control mechanisms are completely immersed in the coolant. The components constituting the mechanisms may be of thin sections, typically 1-3mm, and consequently have a short thermal time constant thereby enabling the mechanism to respond promptly to fault conditions.

I claim:

1. A fuel sub-assembly for a nuclear reactor, said sub-assembly comprising an elongated tubular housing having, at or adjacent opposite ends thereof, coolant inlet means and coolant outlet means respectively, a coolant traversable fuel-bearing region enclosed within the housing between the inlet means and the outlet means, means comprising at least one elongate element located within, and extending generally longitudinally of, the housing for undergoing differential longitudinal thermal expansion relative to said housing as the temperature of the coolant increases, and radially extensible means coupled to said elongate element and to said housing and responsive to differential longitudinal thermal expansion of said element relative to said housing for projecting beyond the outer periphery of the housing so as to effect, in use, relative displacement between the sub-assembly and a neighbouring sub-assembly or sub-assemblies.

2. A nuclear reactor comprising a plurality of elongated, generally vertically-oriented fuel sub-assemblies mounted in side-by-side relation and supported at their lower ends by a core support structure, each sub-assembly comprising an elongated tubular housing having coolant inlet means at or adjacent its lower end and coolant outlet means at or adjacent its upper end and enclosing, at a level intermediate the inlet and outlet means, a fuel-bearing region which the coolant traverses in flowing through the housing from the inlet means to the outlet means, at least some of the fuel sub-assemblies each being provided with at least one elongate element located within, and extending generally longitudinally of, the housing for undergoing differential longitudinal thermal expansion relative to said housing as the coolant temperature increases, and radially extensible means coupled to said elongate element and to said housing for translating longitudinal differential thermal expansion of said elongate element relative to said housing into displacement of the associated sub-assembly relative to at least one neighbouring sub-assembly.

3. A sub-assembly as claimed in claim 1 in which the radially extensible means is operable to extend radially in a progressive manner in response to differential longitudinal thermal expansion between said element and said housing as the coolant temperature rises.

4. A sub-assembly as claimed in claim 1 in which said element is responsive to the coolant temperature prevailing in a region above said fuel-bearing region.

5. A sub-assembly as claimed in claim 1 in which the said element is constrained, at one end thereof, against movement relative to the housing of the associated sub-assembly.

6. A sub-assembly as claimed in claim 1 in which said element is fabricated from a material having a co-efficient of thermal expansion greater than that of the material of the housing.

7. A sub-assembly as claimed in claim 1 in which said radially extensible means includes at least one pivotally deflectable element mounted on the associated housing.

8. A sub-assembly claim 7 in which the pivotally deflectable element is mounted adjacent a respective opening in a side wall of the associated housing.

9. A sub-assembly as claimed in claim 7 in which the pivotally deflectable element includes a resilient portion through which it is coupled to the associated housing.

10. A sub-assembly as claimed in claim 1 in which said element is of annular configuration arranged with its axis generally parallel with the axis of the associated housing.

11. A sub-assembly as claimed in claim 10 in which said element has a bellows configuration.

12. A sub-assembly as claimed in claim 11 in which the bellows is of a bimetallic nature.

13. A sub-assembly as claimed in claim 1 in which the thermally expansible element comprises a number of longitudinally overlapping members connected in serial fashion, an intermediate one of said members having a lower co-efficient of thermal expansion than the members between which it extends.

14. A sub-assembly as claimed in claim 13 in which said members comprise a first axially-extending member coupled at one end to the housing, a second axially-extending member coupled at its one end to the opposite end of said one member so as to extend back towards said one end of the first member, and a third axially-extending member coupled to the opposite end of the second member so as to extend towards said one end of the latter, the second member constituting the intermediate member having a lower co-efficient of thermal expansion.

15. A sub-assembly as claimed in claim 1 in which said element is in the form of a rod or bar.

16. A reactor as claimed in claim 2 in which the radially extensible means is arranged to contact said neighbouring sub-assemblies only when the coolant temperature reaches or exceeds a predetermined value above the normal reactor operating temperature.

* * * * *